United States Patent [19]
Dowell

[11] Patent Number: 4,908,985
[45] Date of Patent: Mar. 20, 1990

[54] SYSTEM AND APPARATUS FOR HYDROPONIC GARDENING

[75] Inventor: Michael S. Dowell, Pfafftown, N.C.

[73] Assignee: Pathway Systems, Inc., Winston-Salem, N.C.

[21] Appl. No.: 202,954

[22] Filed: Jun. 6, 1988

[51] Int. Cl.⁴ .............................................. A01G 31/00
[52] U.S. Cl. .......................................... 47/62; 47/81; 47/64
[58] Field of Search ................................ 47/60-64, 47/81

[56] References Cited

U.S. PATENT DOCUMENTS

| | | |
|---|---|---|
| 2,026,322 | 12/1936 | Raines . |
| 2,639,549 | 5/1953 | Wabben ................................ 47/62 |
| 4,004,067 | 1/1977 | Briggs ................................. 429/57 |
| 4,079,547 | 3/1978 | Walker ................................ 47/62 |
| 4,133,141 | 1/1979 | Lee . |
| 4,248,013 | 2/1981 | Allen . |
| 4,369,598 | 1/1983 | Beckwith . |
| 4,392,328 | 7/1983 | Walker . |
| 4,407,092 | 10/1983 | Ware . |
| 4,482,593 | 11/1984 | Sagel ................................... 428/97 |
| 4,531,324 | 7/1985 | Yang . |

FOREIGN PATENT DOCUMENTS

| | | | |
|---|---|---|---|
| 192482 | 8/1986 | European Pat. Off. ................ 47/62 |
| 235953 | 9/1987 | European Pat. Off. ................ 47/62 |
| 2255843 | 7/1975 | France ................................... 47/81 |
| 869702 | 10/1981 | U.S.S.R. ................................ 47/62 |

Primary Examiner—Henry E. Raduazo
Attorney, Agent, or Firm—Judith E. Garmon

[57] ABSTRACT

A hydroponic gardening system includes an apparatus for supporting the growth of selected plants, which apparatus includes a housing having a lower-level nutrient tank and a plant support tray with a dual-level aeration chamber therein. Seed germination cubes are positioned on the tray adjacent the aeration chambers, and a uniquely designed capillary mat overlies the floor in both levels of the aeration chamber and underneath the seed germination cubes. End portions of the capillary mat extend down into the nutrient tank. Nutrient is conducted from the tank through the capillary mat to the plant root system which develops and grows in the aeration chambers. While the root system is nourished and moistened by the capillary flow of nutrient fluids from the nutrient tank into the aeration chamber, the structure of the dual-level aeration chamber is such that the roots are maintained in an environment of freely circulating air and conditions of 100 percent humidity.

3 Claims, 6 Drawing Sheets

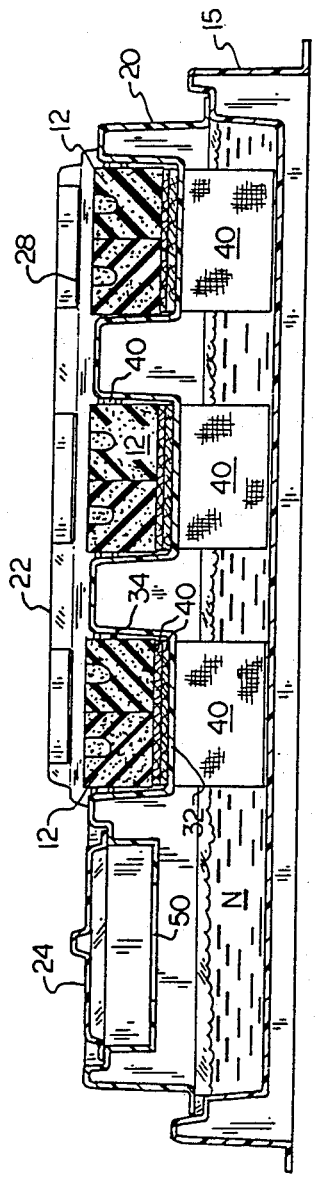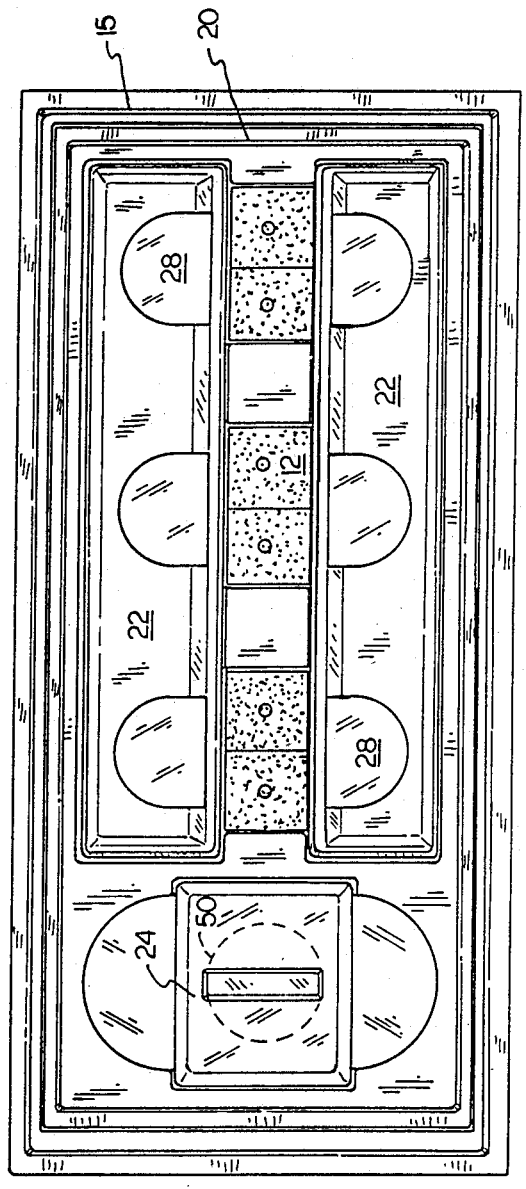

FIG. 5
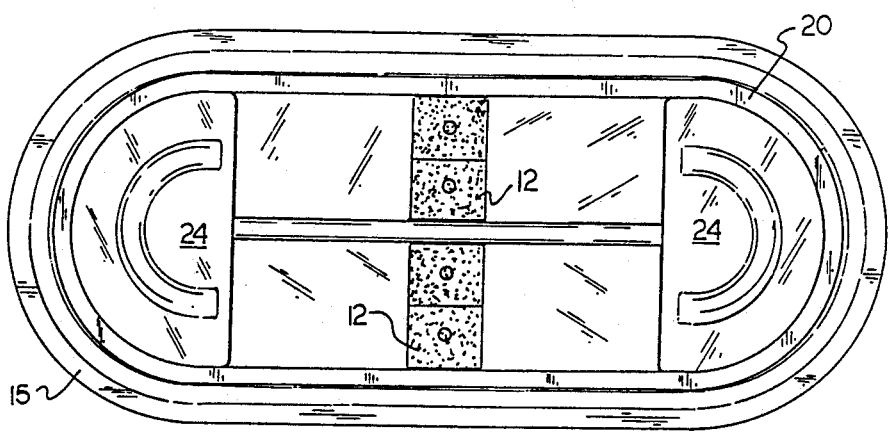
FIG. 6
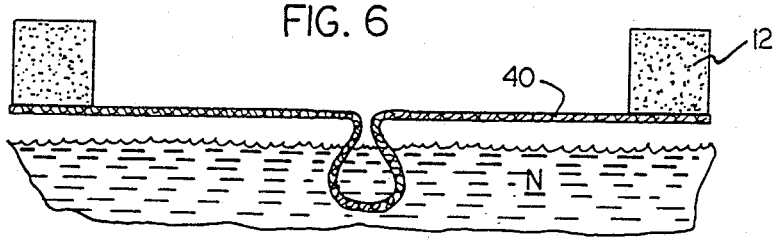
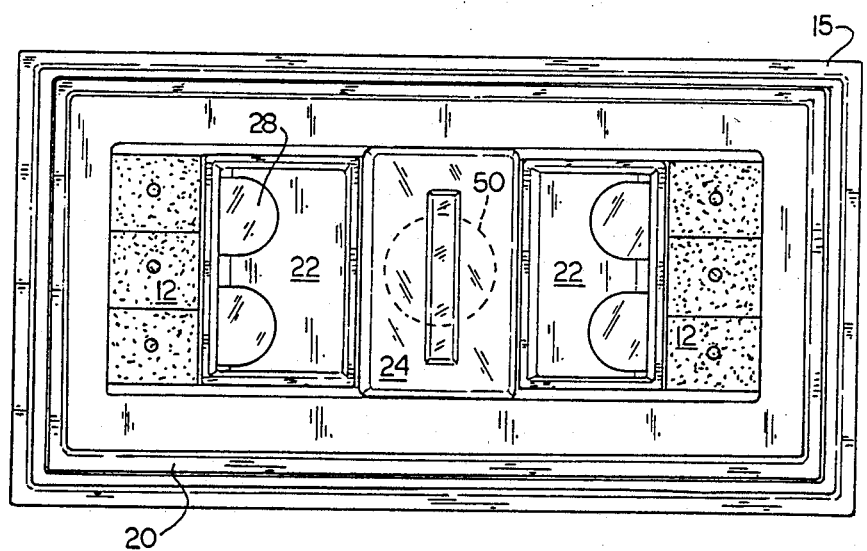
FIG. 11

FIG. 9
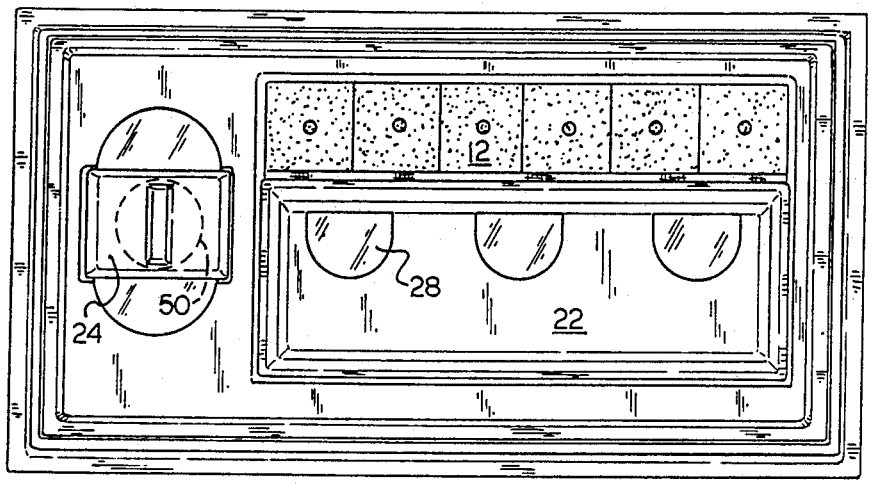
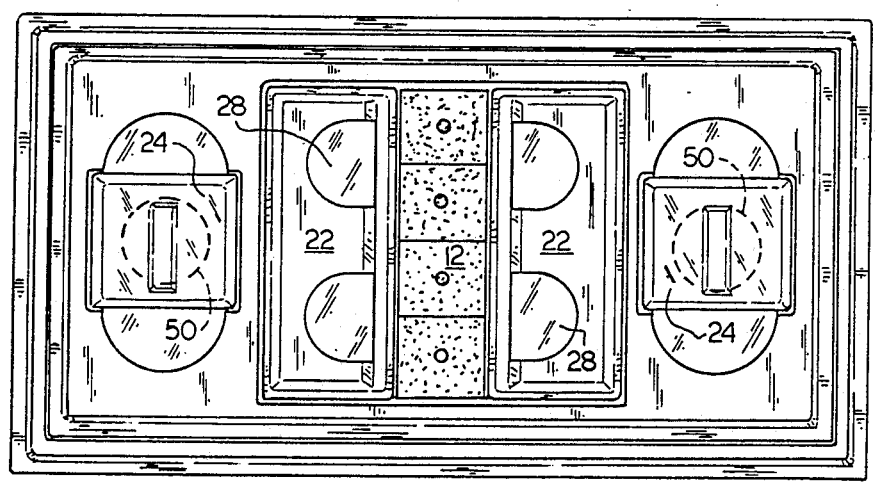
FIG. 10

SYSTEM AND APPARATUS FOR HYDROPONIC GARDENING

BACKGROUND AND SUMMARY OF THE PRESENT INVENTION

Hydroponic gardening, or the growing of plants in a fluid nutrient mix rather than in soil, has increased in popularity dramatically in recent years. The reasons are many and are generally a result of lack of space for conventional subterranean gardens and a lack of time for tending such conventional gardens.

In hydroponic gardening a nutrient solution provides all of the elements essential to plant growth and development. In soil-grown plants, the plants must develop a large root system in order to span the distances necessary to obtain a balanced supply of nutrients from the soil. Development of such a large root system necessarily reduces the overall growth of the plant and its fruit production. Conversely, hydroponic gardening systems provide a constant, balanced supply of the essential nutrients to the plants and thereby eliminates the need for development of large root systems. Because the need for large root systems is eliminated in hydroponic gardening, it is possible to grow much larger plants and a larger number of plants in a substantially smaller area. Plant selection and spacing is limited only by available light sources.

In most of the known hydroponic systems on the market today, an electric pump is required to circulate and thereby aerate the nutrient fluid. Plant roots use the oxygen which is dissolved in water and when the oxygen is not replaced, the root system is damaged to the point of killing the plant. For example, in overwatered soil-grown plants, water fills the airspaces between the soil particles and as the plant uses the available oxygen dissolved in that water, and is without access to more oxygen, the root system dies.

Another well-known approach to hydroponic gardening is a wick system wherein the growing medium or seed cubes are kept moist by strips of wicking material that hang into the nutrient tank below the growing medium and feeds fluids by wicking action to the plants. Such wick systems are somewhat satisfactory for growing small plants but are grossly insufficient for delivery of nutrient fluid to larger plants which require substantial and continuous fluid supply for good production of fruits and vegetables.

The present invention overcomes the problems with known hydroponic systems, eliminating the need for a pump to aerate the nutrient and also providing a sufficient nutrient supply to plants of any size. Even large plants such as tomatoes are successfully grown in the present system. In the improved hydroponic systems, a unique multilevel aeration chamber is built into the plant support tray or portion of the gardening apparatus. This multilevel aeration chamber is separate from and positioned above the nutrient fluid tank so that the plant root systems which develop in the aeration chamber are constantly exposed to freely circulating air that is kept at 100 percent relative humidity. This multilevel arrangement gives the root system a constant supply of oxygen from the circulating air, without the problem of drowning the root system in a nutrient fluid supply that is not mechanically aerated. The small portion of the root system that grows in the nutrient fluid reservoir is kept alive by diffusion of oxygen from the root mass which grows in the multilevel aeration chamber.

The root system growing in the multilevel aeration chamber is supplied continuously with nutrient fluid by use of a capillary mat that covers the plurality of support surfaces or floors in the aeration chamber, and the ends of which mat extend down into the nutrient fluid tank. By capillary action, nutrient fluid moves upwardly along the fibers of the mat and thereby is supplied to the root system in the aeration chamber and to the growing medium. Access covers are provided to allow viewing the root system without disturbing root formation, and to allow for the replenishment of nutrient fluid.

The apparatus of growing unit is formed from a rigid and durable polymeric material and is provided in various sizes and with various arrangements of the growing medium and associated access covers. It was a primary objective of the present invention to provide an improved hydroponic gardening apparatus and system wherein the nutrient fluid and plant root systems could be aerated and thereby supplied with oxygen, without the use of expensive mechanical pumps and timers. It was also an objective of the invention to provide a multilevel aeration chamber in a hydroponic gardening system, through which chamber air freely circulates and supplies the plant root systems with a constant supply of oxygen while maintaining 100 percent relative humidity in the chamber. It was also an objective to provide a compact hydroponic system for growing plants of any size, and one particularly for development of larger plants which have previously been difficult to grow in hydroponic systems. Other and further objectives and advantages of the present invention will become apparent when the following detailed description is studied in conjunction with the accompanying drawings.

In the drawings:

FIG. 3 is a cross-section taken along lines III—III of FIG. 1;

FIG. 5 is a plan view of an alternate embodiment showing an alternate arrangement of seed cubes and access covers;

FIG. 6 is a partial sectional view of the alternate embodiment shown in plan view in FIG. 10; and FIGS. 7 through 11 are plan views of a variety of alternative arrangements of seed cubes and access covers.

DETAILED DESCRIPTION OF A PREFERRED EMBODIMENT

Figure 1:
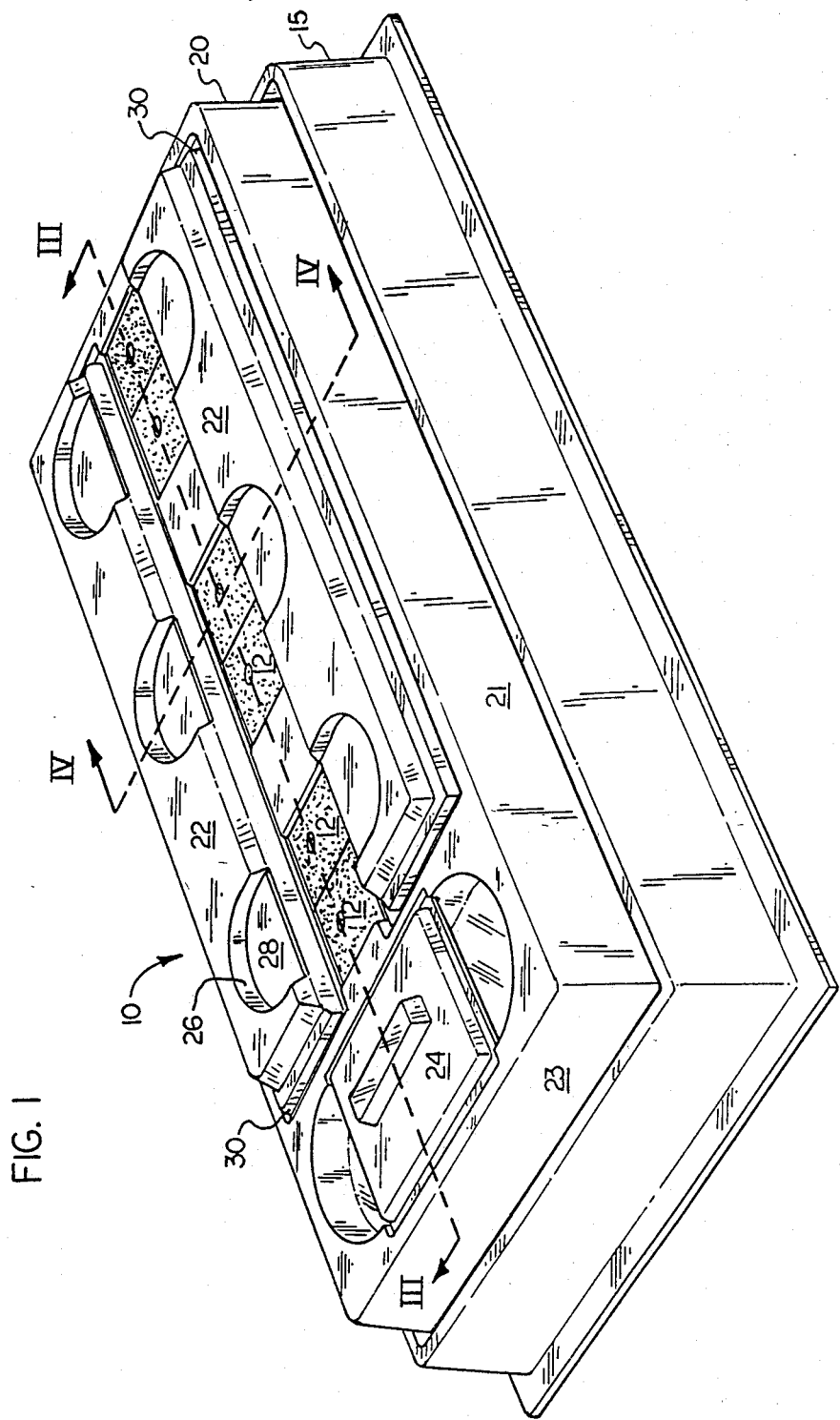
FIG. 1 is a perspective view of a preferred embodiment of the gardening unit.
Figure 2:
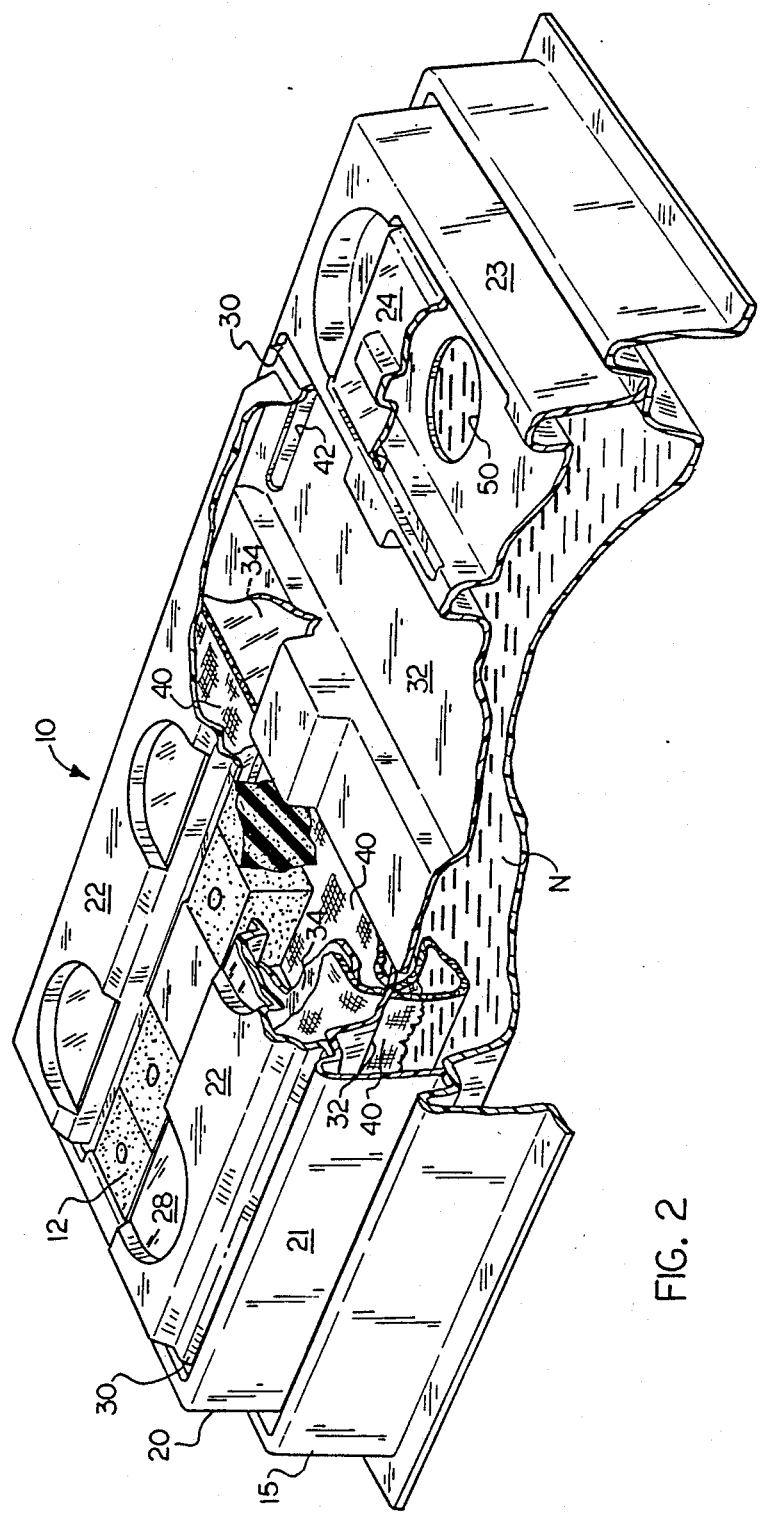
FIG. 2 is a perspective view of the embodiment shown in FIG. 1 but with parts broken away.
Figure 7:
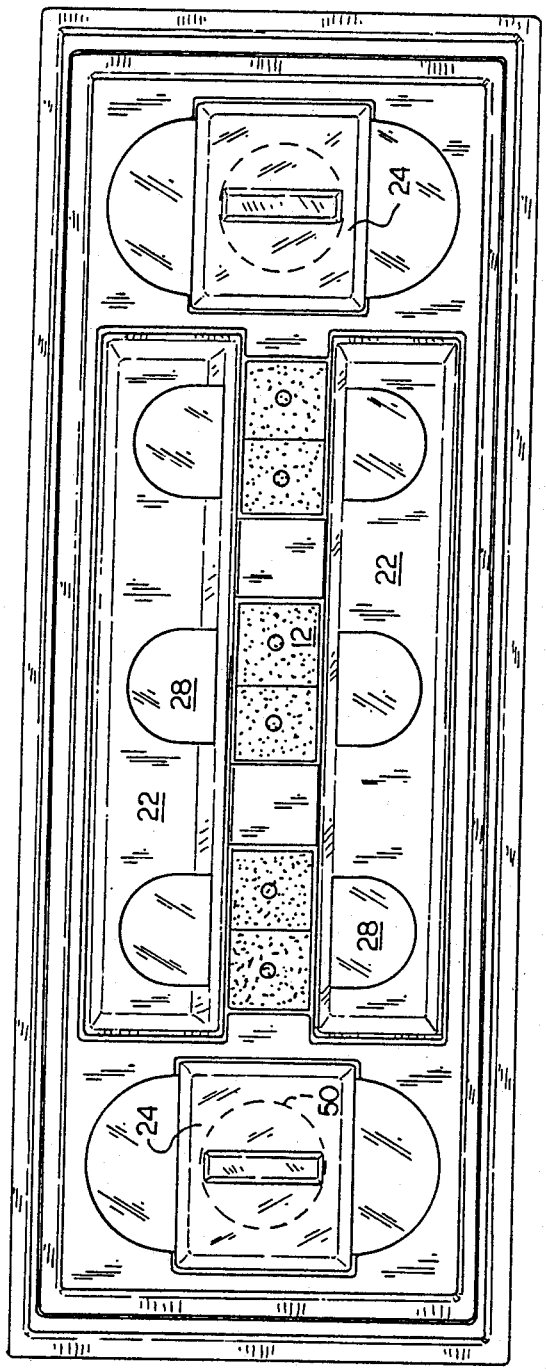

Looking first at FIGS. 1 and 2, the hydroponic gardening unit 10 is illustrated according to a preferred embodiment including a nutrient tank 15 and a plant supporting tray 20 which is removably positioned above the nutrient tank 15. The plant growing or supporting tray 20 has a floor and adjacent sidewalls 21, endwalls 23, and contains the growing medium or seed cubes 12 in an arrangement (in this embodiment) along the center of the support tray. On either side of the seed cubes 12 are access covers 22 which can be lifted off the tray to provide a view and access to the aeration chambers and the root system therein, but without disturbing or injuring the root system. A reservoir cover plate 24 lifts away to provide access to the nutrient fluid tank 15 for the addition of water and nutrient fluids thereinto. Arcuately shaped cutouts 26 along the surface of each of the aeration chamber access covers 22 retain plant labeling members 28 therein for purposes of identifying the species of plant growing in a given seed cube 12. The labeling device is generally comprised of a thin, smooth-surfaced sheet of polystyrene. The name of the plant can be written on the polystyrene and erased when old plants are removed and new ones are added.

Figure 4:
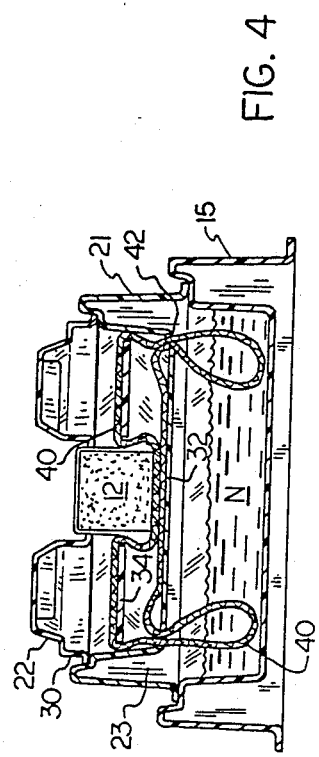
FIG. 4 is a cross-section taken along lines IV—IV of FIG. 1.

The access covers 22 include a supporting base portion 30 for supporting the cover above the aeration chambers below. Looking more particularly at FIGS. 2 and 4, the access covers 22 are cut away to show the detail of the aeration chambers. Access covers 22 are approximately three-quarters of an inch to an inch in height and the underside is substantially hollow to provide clearance for the root system which will develop in the aeration chambers.

In this embodiment the multilevel aeration chamber includes two root-supporting levels. The first level 32 is actually the base level of the plant-supporting tray 20. The seed cubes 12 are supported on this first level 32. The second level 34 of the aeration chamber is comprised of a separator plate supported on ledges 35 on either side of the seed cubes 12, and supports a second layer of root growth from the seed cubes. Overlying both levels 32, 34 of the aeration chamber is a sheet of capillary material 40, the ends of which extend down into the nutrient fluid in tank 15. The ends of the capillary mat 40 are inserted through a plurality of slots 42 which are cut into the surface 32 of the plant supporting tray 20. The slots are relatively narrow and of a width only sufficient to receive the width of the capillary material. The slots 42 must be designed only to allow passage of the capillary mat therethrough, and not allow passage of light into the nutrient tank.

The capillary material 40 is a continuous loop of openweave textile material made from any one of a variety of fibers including nylon, acrylic, etc. A synthetic material is preferred because of the improved capillary action, and acrylic is generally preferred because it has been found that acrylic delivers approximately 30 percent more of the nutrient fluid than does a nylon mat. Although the capillary mat is generally provided in a continuous belt or loop form, it is obvious that it could be provided in sheet form and the loose ends inserted through the slots 42 for access to the nutrient fluids. Further, non-woven materials and/or natural fibers may be utilized. In use, the capillary mat delivers a continuous supply of nutrient fluid by capillary action to the seed cubes 12 and to the developing plant root system in both levels of the aeration chamber. Although the mat of the present invention is designed to be discarded after use, it is anticipated that a capillary mat will be developed which can be reused. It is also anticipated that a variety of types of capillary mats might be developed for growing various types of plants. Where some plant root systems develop more quickly on an open-weave mat, other plant varieties perform better on a more closely woven mat.

The plurality of seed cubes 12 are positioned on top of the capillary mat 40 and receive a continuous supply of nutrient therefrom. The seed cubes are preferably of a urethane type commonly known for seed germination. Urethane is preferred because it will retain moisture but does not stay saturated to the degree that peat cubes or pellets do, and which saturation can be detrimental to plant growth. Additionally, the urethane discourages fungus growth.

Returning to the structure of the aeration chamber, the multilevel, or the preferred dual-level, aeration chamber is an important advance in hydroponic systems for many reasons. In the preferred embodiment the aeration chamber is shown with two levels; however, it is possible that in larger, perhaps commercial, hydroponic systems, more than two levels might be desired. The multilevel aeration chamber encourages the development of a large root system above the level of the liquid nutrient tank. The root system which actually reaches the nutrient tank in the present system consists primarily of root branches which originate on the capillary mat and branch downwardly into the nutrient fluid. The portion of the root system above the nutrient tank branches out onto the levels of the aeration chamber. Because this root system is outside of the nutrient fluid there is a substantially increased oxygen intake which is diffused to the smaller system of roots in the nutrient tank. The increased oxygen supply substantially improves growth of the plant and production of fruit, vegetables or flowers. Additionally, because the aeration chamber is multilevel, the aeration chamber surface area is at least doubled. Because the levels are separated, there is a means for introduction of freely circulating air and oxygen into the various layers of the root system. Due to the structure of the aeration chamber and the use of an overlying capillary mat on the floors of the chamber, the humidity level is always at saturation point or 100 percent relative humidity, meaning that the roots are not allowed to dry out and are constantly aerated.

Access to the nutrient tank 15 is provided in two ways. Initial access when the system is being set up is gained by removing the plant supporting tray 20. The plant support tray 20 can be removed during the growing period but could be awkward and heavy to move with the plants growing therein. Additionally, it is undesirable to disturb the plants unless necessary. Therefore, in order to provide a port for the addition of nutrients and/or water to the tank 15, the access cover 24 is removed to reveal an opening through the tray surface 32. Not only does this port 50 provide access for the addition of water and/or nutrients, but it also functions as an air entry port for free circulation of air into the nutrient tank. This circulation of air into the tank 15 further increases the oxygen supply to the plant system as a whole. The opening 50 in surface 32 is sufficiently large to allow circulation of air and addition of fluids, but must be of a dimension somewhat smaller than the access cover 24 so that sunlight does not enter the nutrient tank. Entry of light through the opening 50 or the slots 42 promotes growth of algae which is undesirable in hydroponics. The design of the present apparatus is highly efficient at preventing entry of light into the nutrient tank and aeration chamber and therefore substantially reduces the growth of algae known to be a problem in previous systems.

For maintenance purposes, addition of nutrients and water are made through the opening 50. A drain (not illustrated) is provided on the underside of the tank 15 for gravity drainage of the nutrient tank. In hydroponics it is necessary to periodically drain the nutrient fluid and replace with fresh fluids. The drain element which is of a conventional nature can be easily opened from the underside of the nutrient tank 15 and the nutrient fluids allowed to drain therethrough by gravity.

Although the preferred embodiment in FIGS. 1 and 2 is shown as a single unit, it is anticipated that multiple units can be connected together for large gardening installations. Where such large installations are made, it is also anticipated that it will be desirable to connect a water supply to at least one of the tanks for supplying water by means of an interconnected water delivery system to all of the tanks. Control of such a water supply could be with electronic timers, or mechanically by use of float valves which monitor the nutrient fluid level in each of the tanks and when the level drops below a prescribed point, the valve is activated to deliver additional water to the tanks. Use of such an automatic water supply makes hydroponic gardening virtually maintenance free for extended periods of time.

FIGS. 7-11 illustrate a variety of arrangements of seed cubes 12 and access covers 22 which can be provided. Many people prefer using hydroponics for growth of small house plants. For such installations, small units are provided wherein four to six seed cubes would be the maximum. However, even the smaller units using six growing cubes have been demonstrated to support three large tomato plants and three smaller plants such as small varieties of pepper or ornamental house plants.

Additionally, FIG. 6 illustrates an arrangement for a small unit whereby the aeration chamber has only one level 32'. A capillary mat overlies the floor 32' of the one level and extends beneath the seed cubes as described for the multilevel embodiment. In this embodiment (Plan view shown in FIG. 11) the seed cubes 12 are along the outer edges of the plant growing tray, and the access cover is through the mid-portion. Although this is not the preferred model, it is functional in many small installations.

All units are constructed by a vacuum molding process although it is possible that other methods of molding and a variety of materials might be utilized. It is also anticipated that models wherein the more functional components shown herein are housed in exterior, decorative facades for use in offices or more formal living areas of a home. All of the components of the apparatus are designed to be durable and to function over extended periods of time and frequent reuse. It is also anticipated that those skilled in the art will realize other further modifications, all of which are expected to remain within the scope of the claims below.

What is claimed is:

1. A hydroponic gardening apparatus comprising:
   (A) a housing for supporting growth and development of selected plants;
   (B) said housing including:
      (i) a nutrient tank for containing a supply of liquid nutrient to support the growth of the selected plants; said nutrient tank further including:
         (a) A capillary mat formed of material capable of conducting nutrient fluids through the fibers thereof by capillary action;
         (b) said capillary mat overlying each level of said multilevel aeration chamber, and a portion of said capillary mat extending into the fluid contained in said nutrient tank;
      (ii) a plant-growing tray including a multilevel, enclosed aeration chamber separated from and supported above said nutrient tank; said plant-growing tray including:
         (a) a plurality of adjoining side and end walls and base member for supporting said tray above said nutrient tank;
         (b) a floor extending between said side and end walls; a first portion of said floor functioning as one level of said multilevel aeration chamber;
         (c) a plurality of spaced slots cut along prescribed portions of the intersection of said side walls and said floor for passage of said capillary mat therethrough to said nutrient tank below;
         (d) at least one removable separator plate spaced above said first portion of said floor to function as an additional level of said aeration chamber;
      (iii) means for supporting a plurality of seed germination cubes adjacent to and outside said enclosed multilevel aeration chamber, the root structure of the plants extending into said aeration chamber and into the body and foliage of the plant developing outside said aeration chamber;
   (C) said aeration chamber including means for maintaining the root system in exposure to the free air circulation and under conditions of substantially 100% relative humidity.

2. A hydroponic gardening system according to claim 1 wherein said plant growing tray further includes:
   (a) a removable access cover positioned in spaced relationship above said separator plate;
   (b) a port for entry of air and additional fluids into said nutrient tank, and a removable cover positioned in spaced relationship above said port.

3. A hydroponic gardening system according to claim 2 wherein said port is of a dimension smaller than the dimension of said overlying cover, for preventing entry of light into said nutrient tank.

* * * * *